Dec. 11, 1934.   W. A. FRANTZ ET AL   1,983,661
CENTRIFUGAL DEVICE
Filed Nov. 24, 1930
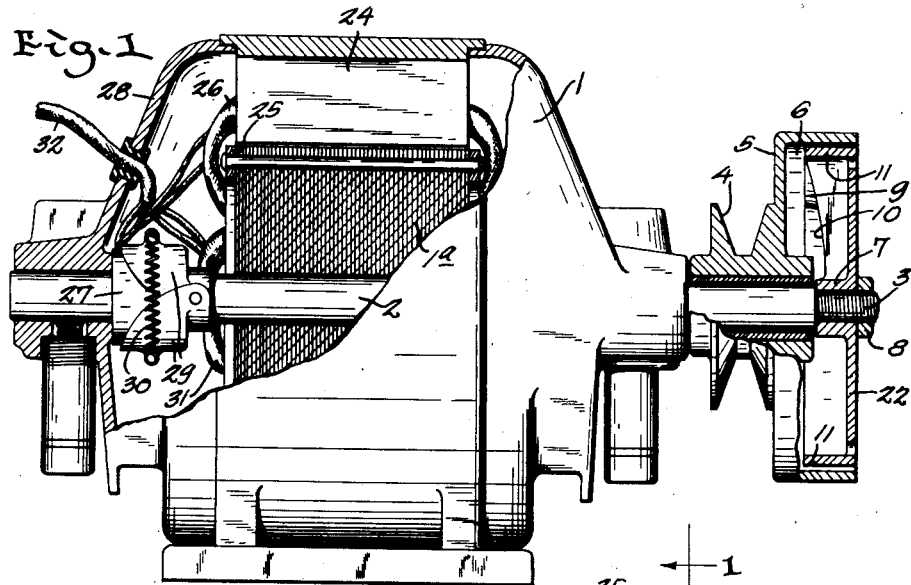
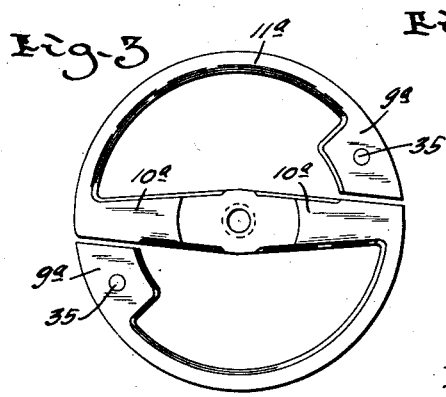
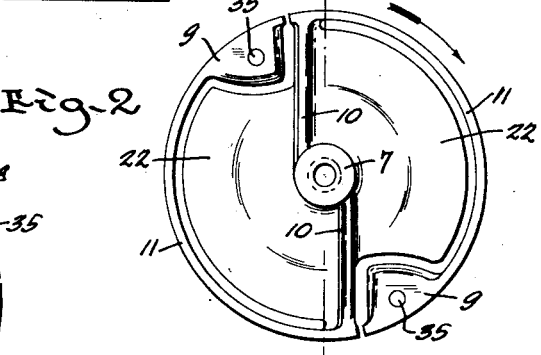
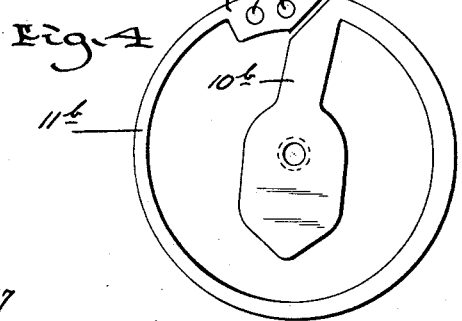
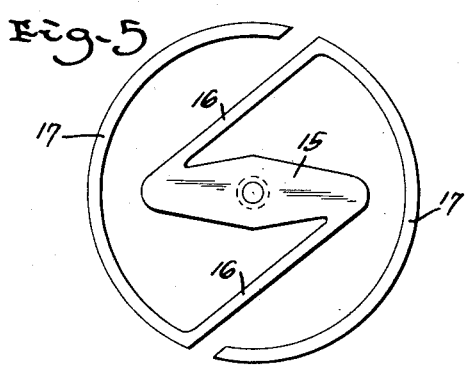
Walter A. Frantz
Arthur W. Seyfried
INVENTORS
BY Smith and Freeman
ATTORNEYS

UNITED STATES PATENT OFFICE 1,983,661

CENTRIFUGAL DEVICE

Walter A. Frantz, Cleveland Heights, and Arthur W. Seyfried, Cleveland, Ohio, assignors to The Apex Electrical Manufacturing Company, Cleveland, Ohio, a corporation of Ohio Application November 24, 1930, Serial No. 497,678

11 Claims. (Cl. 192—105)

This invention relates to electric motors and has particular reference to the provision of a simple, inexpensive and reliable mechanism which shall allow the motor armature to attain a definitely predetermined speed before the load shall become applied thereto. The invention relates primarily to fractional horse-power, alternating-current motors of the induction type, since direct-current motors have sufficient flexibility of operation so that starting under load is no particular hardship; but alternating-current motors of the simple split phase, squirrel-cage, induction-type have the particular disadvantage of exhibiting a rather small starting torque, and a very large starting current, so that they have heretofore been considered unfitted for use on many domestic machines for which they would be highly desirable if the starting difficulty could be overcome. Modes of overcoming the starting difficulty do, in fact, exist, among which may be mentioned, as most common, first, the use of special field windings, called starting coils, interspersed with the regular field windings and having the phase advanced or retarded by capacity or inductance, these being thrown out of circuit by a centrifugal switch as soon as the armature reaches a predetermined speed; nearly all small motors (except fan-motors which start so easily as not to need them) are thus equipped, but their effect depends upon the expense incurred since the loading necessary to obtain a substantial splitting of the phase is rather great. For this reason small motors which must start automatically under load are more frequently made of the so-called "repulsion-induction" type, wherein the armature is provided with windings so arranged as to cause the current induced in one part thereof by the magnetic slip to become conveyed, during the starting, to another part thereof where it serves to increase the torque until, at a speed more or less accurately predetermined, a centrifugal switch serves to short-circuit the armature windings into a mere squirrel-cage connection. These devices, when carefully made, are entirely successful, but entail two practical defects: namely, that if well made they are expensive and that if ill-made they give trouble, either by failing to throw out the starting coils until so high a speed is attained that upon a slight overloading of the motor the coils are again thrown into circuit, or that by throwing out the starting coils at too low a speed the task of accelerating the armature is thrown upon the running coils at such a low speed that the torque may not be sufficient. This may result either in burning out the motor or in producing an unpleasant flickering of the light in adjacent illuminating devices. So long as small motors were employed entirely under hand control, as in washing-machines and ironing-machines, or under very light loads as in the case of electric-fans, these difficulties were not important, but the increasing use of small motors and the increasing vogue of automatic control has given added emphasis to the problem. For example domestic refrigerating machinery is started and stopped automatically, the motor being constantly connected to the mechanism in operating relation, and due to the certain peculiarities of refrigerating machine practice, the load imposed on such a motor is greater at starting than it is during actual running. This has heretofore entailed the use of motors of the repulsion-induction type which cost several dollars more to make than a motor of equal indicated horsepower having a simpler type of winding. Furthermore the increasing use of small motors has resulted in their adoption by communities and individuals having an unstable voltage condition such that the overdraft of current due to starting a motor under load may so deplete the voltage as to render it impossible for a motor of that size to get started at all.

According to our invention we equip the shaft of such a motor with a friction clutch of special type, which, being made with a minimum number of parts is not only inexpensive, but is also reliable in its operation, is susceptible of being made in quantity production without impairing its accuracy of operation, and which can be trusted to allow the motor to attain almost its full speed before picking up the load, at which time the operating torque has become sufficiently great to maintain the speed. This enables us to employ plain squirrel cage induction motors successfully in many instances where heretofore the more complicated and expensive windings have been necessary.

This application is a continuation in part of our application filed August 2, 1929, Serial No. 383,048, to which reference is hereby made as to all parts common to the two cases.

In the drawing Fig. 1 is a side elevational view partly in section of an electric motor provided with our improved clutch. Fig. 2 is an end view of the driving element of the clutch shown in Fig. 1. Figs. 3, 4, and 5 are modified forms of driving elements interchangeable with the element shown in Fig. 2.

The numeral 1 indicates an electric motor whose rotor 1ª is carried by the shaft 2 which terminates in a threaded portion 3. While any suitable type of power-transmission element can be employed, we have shown a V-belt pulley 4 rotatably sleeved on the shaft and having at one side an annular shoulder 5 whose inner surface 6 defines a surface of revolution spaced from and coaxial with the shaft 2.

The driving element of the clutch comprises a hub portion 7 fixedly secured on the end of the shaft 2, as by being screwed on the threads 3 and locked thereon by the nut 8, and also comprises certain spokes or connecting portions 10 which are integral with the hub and also integral with the flexible rims 11. These rims are located immediately inside the surface 6, and are curved complementarily thereto, being connected to the spokes at one end and free to move radially at all points circumferentially spaced therefrom. The free ends of the rims 11 have integral counterweights 9 to increase the centrifugal force with which the same expand. The disk portion or web 22 shown in Figs. 1 and 2 is provided to strengthen the spokes 10 and to constitute a shield for the clutch.

In making the driving element shown in Fig. 2, the part is first cast in a single piece with the rims 11 continuous and connected at each end to the spokes 10. The hub is then drilled, tapped, and surfaced, the rims turned down smoothly and then sawed through at a point adjacent to the counterweights 9.

In the element shown in Fig. 3 the parts 10ª, 11ª, and 9ª correspond to the parts 10, 11, and 9, respectively, of the element shown in Fig. 2 and are made slightly heavier on account of not using the reenforcing disk or web 22.

The modification shown in Fig. 4 has but one rim portion 11ᵇ, and one counterweight 9ᵇ. These parts are connected to the hub of the device by the single spoke 10ᵇ and the counterweight 9 constitutes a balance therefor.

In the modification shown in Fig. 5, the rim portions 17, are connected to the extended hub portion 15, by means of flexible extensions 16 which are angularly disposed with respect to the diameter of the element, so that under the influence of frictional and centrifugal force the entire length of the rims 17 is forced into engagement with the flange 5 of the driven element.

In Fig. 2, the arrow indicates the direction of rotation for all of the driving elements shown. By rotating these parts in the direction indicated, namely with the free end of the rim portion advancing, the free end of the rim first engages the flange 5, whereupon the force of friction acting tangentially in a direction to oppose the rotation of the driving element, tends to force a greater portion of the rim into engagement with the driven member and to increase the contact pressure between these parts, and in this manner increase the maximum amount of power that may be transmitted through the clutch before slippage occurs.

In the present embodiment the field is shown at 24 and the rotor 1ª contains a mere squirrel-cage winding 25, but the field contains additional starting coils 26 which are connected through contact-elements 27 carried by one of the end-members 28 of the motor adjacent to the shaft 2 and engaged by the contact-members 29 when the armature is at rest. These contact members 29 are rotatable with the armature and are separable diametrically from each other against the tension of springs 30, which effect a connection of the starting coils in circuit according to some determined plan while the rotor is at rest, but allow said contact members to fly apart and disconnect the starting coils as soon as the rotor reaches a predetermined speed, generally about one-half speed, although the time of disconnection varies with the manufacturer and with the amount of care involved in the construction. The field coils 31 are continuously connected to the electric cord 32. This amount of care need be only small in the case of a motor which is to start without load, which is essentially the condition existing when our improved mechanism is used, even though the power-transmission element 4 be connected at all times to some machine which is to be driven thereby, and when such a centrifugal starting switch is employed in connection with our improved driving clutch, only the clutch need be made accurately, since it does not come into operation until after the starting-coils have been disconnected. Due to the fewness of parts and the simplicity of the device our improved clutch can be fashioned very inexpensively and can be adjusted for speed merely by drilling out more or less metal from the free end of the centrifugal arms as shown at 35. This device is intended for, and finds its chief use with small induction motors, below one-half horse power in size, although it is of course not limited to such use nor in any wise except as specifically set forth in the annexed claims which we desire may be construed each independently of limitations contained in other claims.

Having thus described our invention what we claim is:

1. In a centrifugal clutch, a drive shaft, a freely rotatable cup-shaped driven element sleeved on said shaft, and a driving element rigidly carried by said shaft formed in its entirety from a single integral piece and having a centrifugally movable portion adapted at a predetermined speed to effect driving connection with said driven element, said driving element being received in the first named element and having a disk-like portion providing a cover or closure therefor.

2. In a centrifugal clutch, a drive shaft, a cup-shaped driven element having a part rotatably journaled on said shaft and also having an inner surface of revolution spaced from and coaxial with said shaft, and a one-piece driving element fixed to said shaft and having relatively flexible and centrifugally displaceable portions integral therewith for engaging said surface of the driven element when said driving element is rotated about its axis, said driving element having a disk-like portion providing a closure for the open end of said cup-shaped element.

3. In a device of the character described, in combination, a rotatable driving shaft, a power transmission element journaled on said shaft and also having an inwardly-facing surface of revolution coaxial with said shaft and spaced therefrom, and a one-piece driving element fixedly secured to said shaft and interposed between said shaft and surface, said driving element having a disk-like side wall complementary to a wall of said element and an outer face complementary to said surface and having a centrifugally movable part integral with the remainder of said driving element but flexibly joined thereto adapted at a predetermined speed to effect driving connection with said power transmission element.

4. In a device of the character described, the combination with a driving shaft, a freely rotatable power transmission element journaled on said shaft and having an inwardly-facing shoulder formed as a surface of revolution spaced from and coaxial with said shaft, and a one-piece disk-like driving element rigidly secured to said shaft, having a flexible arcuate rim portion integrally connected to the remainder of said driving element at one end and unsupported at a point circumferentially removed therefrom, the unsupported end of said rim portion being weighted and disposed closely inside said shoulder so as to engage said driven element frictionally when said shaft is rotated at a predetermined speed, the outer face of said driving element providing a smooth surface which serves as a closure for one side of the device.

5. In a device of the character described, the combination with a driving shaft, a freely rotatable power transmission element rotatably journaled on said shaft and having an internally-facing shoulder formed at a surface of revolution spaced from and coaxial with said shaft, and a one-piece driving element comprising a disk fixedly secured to said shaft with its outer surface substantially in the plane defined by the outer edge of said shoulder, and a flexible arcuate rim portion parallel to and located immediately inside said shoulder and having its outer face complementary to said surface, one end of said rim portion being integral with the disk of said driving element, and the other end of said rim portion being circumferentially spaced therefrom and having an internal enlargement to increase its centrifugal effect, the direction of rotation being in the direction of said unsupported portion.

6. The combination with a driving shaft of a power transmission device rotatably journaled coaxially therewith and having an inwardly-facing shoulder formed as a surface of revolution coaxial with and spaced from said shaft, and a one-piece driving element having a disk fixedly secured to said shaft and also having a laterally extending flexible arcuate rim portion located inside said shoulder and closely conforming to the surface thereof and subtending a substantial portion of the inner circumference of said shoulder, said rim portion having one end integrally connected to the disk of said driving element, and having its opposite end free for centrifugal movement.

7. The combination with a driving shaft of a power transmission device rotatably journaled coaxially therewith and having an inwardly-facing shoulder formed as a surface of revolution coaxial with and spaced from said shaft, and a one-piece driving element having a disk fixedly secured to said shaft and also having a flexible arcuate rim portion located inside said shoulder and closely conforming to the surface thereof and subtending a substantial portion of the inner circumference of said shoulder, said rim portion having one end integrally connected to the disk of said driving element, and having its opposite end free for centrifugal movement, said driving element being secured to said shaft in such position that the free end of said rim portion is located in advance of the fixed end.

8. The combination with a driving shaft, a pulley freely journaled thereon and having at one side an inwardly facing shoulder whose interior defines a surface of revolution spaced from and coaxial with said shaft, and a one-piece driving element rigidly secured to said shaft and comprising a disk-like hub part and a relatively thin rim part, the rim part being arcuate and flexible and located closely inside said shoulder, one end of the rim part being integrally joined to said hub part, and the rest of said rim part being circumferentially spaced therefrom a slight distance and free to move radially under the influence of centrifugal force, the exposed surface of said driving element providing a smooth closure for one side of the device.

9. The combination with a driving shaft, of a one-piece driving element fixedly secured to the end of said shaft and a pulley freely journaled on the exterior of said shaft to one side of said driving element, said pulley having an inwardly-facing shoulder whose internal surface defines a surface of revolution spaced from and coaxial with said shaft, and said driving element having a disk and a laterally extending rim portion complementary to said surface and parallel therewith and located close to the interior thereof, and also a hub portion formed centrally of said disk and which is secured to said shaft, one end of said rim portion being integrally connected to said disk and hub portion, and all parts of said rim portion circumferentially spaced from such disk being radially flexible and the free extremity of said rim portion having an integral enlargement whereby its centrifugal effect is increased.

10. The combination with a driving shaft of a centrifugally operated clutch carried thereon, said clutch comprising an integrally formed cup-shaped driven member having a hub portion rotatably journaled on said shaft and an axially extending offset rim portion having an interiorly facing friction surface, and an integrally formed cup-shaped driving member having a hub portion fixedly secured to said shaft and an axially extending radially movable centrifugally operated offset rim portion having an exteriorly facing friction surface, said clutch members being assembled in opposed and nested relation with the friction surfaces of their rim portions presented to each other.

11. The combination with a driving shaft of a centrifugally operated clutch carried therein, said clutch comprising an integrally formed cup-shaped driven member having a hub portion rotatably journaled on said shaft and an axially extending offset rim portion having an interiorly facing friction surface, and an integrally formed cup-shaped driving member having a hub portion fixedly secured to said shaft and an axially extending radially movable centrifugally operated offset rim portion having an exteriorly facing friction surface, said cup-shaped driving member having spokes formed on its inner surface merging at their outer ends in said rim portion, said rim portion being formed of discontinuous parts separated from each other and from said driving member except at the point where they join the spokes of said member, said clutch members being assembled in opposed and nested relation with the friction surfaces of their rim portions presented to each other.

WALTER A. FRANTZ.
ARTHUR W. SEYFRIED.